June 5, 1934. A. R. POWELL 1,961,245
METHOD OF AND APPARATUS FOR MEASURING STEAM DECOMPOSITION
Filed Aug. 24, 1929 4 Sheets-Sheet 1

INVENTOR.
Alfred R. Powell.
BY Jesse R. Langley
ATTORNEY.

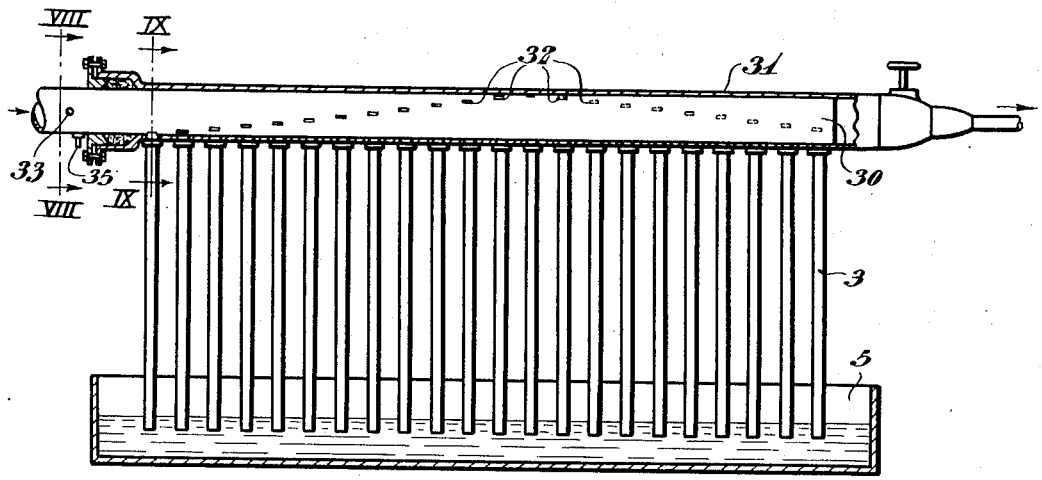
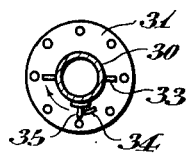 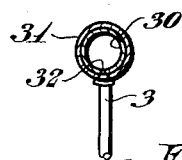
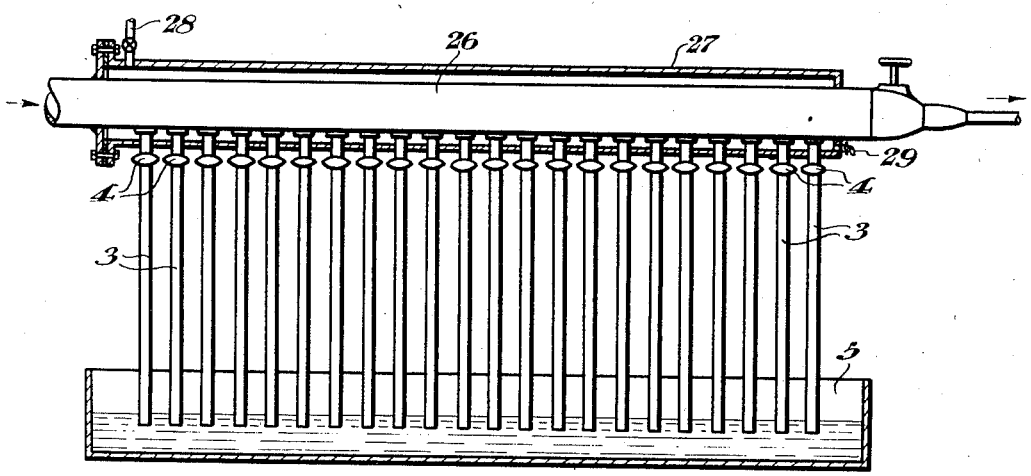

INDEX NUMBERS FOR VARIOUS INLET & ROOM TEMPERATURES

| INLET TEMPERATURE °F | ROOM TEMPERATURE - °F | | | |
|---|---|---|---|---|
| | 60° | 70° | 80° | 90° |
| 190° | 28 | 48 | 66 | 86 |
| 195° | 24 | 44 | 63 | 83 |
| 200° | 20 | 40 | 60 | 80 |
| 205° | 16 | 36 | 57 | 77 |
| 210° | 12 | 32 | 54 | 74 |

INVENTOR.
Alfred R. Powell.
BY Henry Love Clarke
ATTORNEY.

Patented June 5, 1934

1,961,245

UNITED STATES PATENT OFFICE 1,961,245

METHOD OF AND APPARATUS FOR MEASURING STEAM DECOMPOSITION

Alfred R. Powell, Elizabeth, N. J., assignor to The Koppers Company of Delaware, a corporation of Delaware Application August 24, 1929, Serial No. 388,080

9 Claims. (Cl. 73—51)

This invention relates to apparatus for the measurement of the amount of undecomposed steam in gas and has particular application to gas made by a water-gas generator.

When steam passes through the red hot bed of a water-gas generator during the run or making period, some of the steam reacts with the carbon to form blue water gas, while the remainder passes through undecomposed. At the beginning of the run period, when the fuel bed is hottest, 90% or more of the steam is decomposed, while at the end of the period, the percentage of steam decomposed may be as low as 15 to 20%.

If a sample of the mixture of steam and blue water gas leaving the generator is trapped in a chamber at a certain constant temperature, and then allowed to cool at room temperature, a decrease in volume occurs, assuming constant pressure. This decrease in volume is due to two factors, first, the condensation of all of the steam except that amount necessary to saturate the residual gas at room temperature, and, second, the contraction of the gas due to the decrease in temperature.

This latter factor is a constant percentage of the gas volume, provided the initial and final temperatures are always the same. The portion of the contraction due to the condensation of the steam varies, however, according to the relative quantities of steam and blue gas entering the apparatus and serves a measure of the percentage of steam decomposed in the generator.

The present apparatus resulted from an attempt to secure a device that is simple and relatively inexpensive, and comprises a plurality of transparent chambers or tubes in which samples of the gas are trapped at successive intervals of time. Since the several tubes are of uniform volume and at the same temperature the difference in change of volume from tube to tube furnishes visual evidence of the change of percentage of undecomposed steam in the samples taken at the successive intervals of time.

In the drawings,

Fig. 7 is an elevational view partly in section illustrating a modification eliminating the necessity for stop cocks for each individual tube.

Fig. 8 is a vertical cross-sectional view taken on the line VIII—VIII of Fig. 7.

Fig. 9 is a vertical cross-sectional view taken on the line IX—IX of Fig. 7.

Fig. 10 is an elevational view partly in section illustrating a further modification in which the gas entrance tube is surrounded by a steam chamber.

Figure 1:
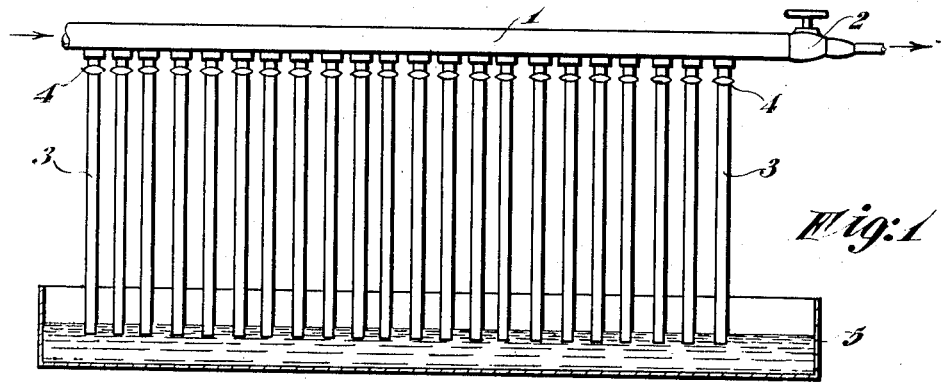
Figure 1 is an elevational view of the apparatus as adapted for hand operation.

The gas to be sampled is allowed to purge rapidly through a horizontal header 1 at the top of the apparatus by means of a valve 2. Vertical glass tubes 3 extend down from this header. Each vertical tube has a stopcock 4 at the upper end by means of which the tube may be opened or closed to the header. The lower ends of the tubes are open and dip into a basin 5 containing water, which may be colored for easier indication.

Figure 3:
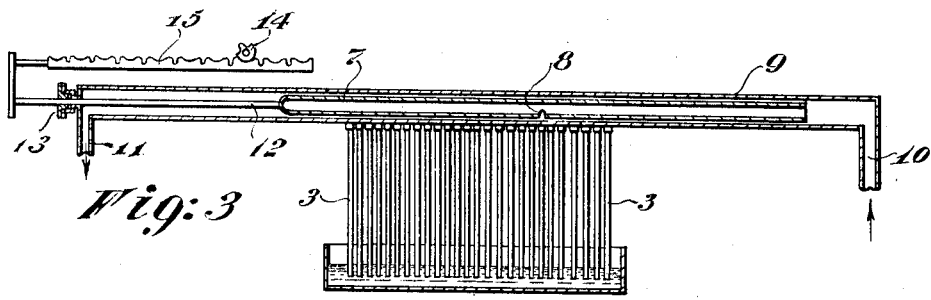
Fig. 3 is a vertical section of a modification of the apparatus of Fig. 1 that is adapted for automatic operation.
Figure 5:
Fig. 5 is an enlarged view of the mechanism for intermittently moving the valve.

The modification shown in Fig. 3 differs from the hand operable form in having a slide valve 7 that is movable longitudinally and takes the place of the plurality of stopcocks 4. A slot or port 8 in the slide valve successively admits a sample of gas to each of the tubes 3 in turn as the valve is moved lengthwise of a header 9.

Figure 4:
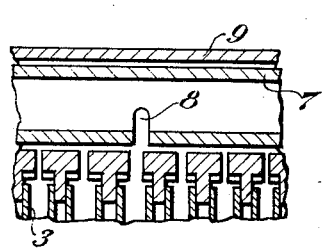
Fig. 4 is an enlarged section of part of the valve shown in Fig. 3.

The header 9 also serves as a valve casing and is long enough to permit ample movement of the valve 7. It is provided with an inlet 10, outlet 11 and a plurality of ports one of which is opposite each of the tubes 3 as shown enlarged in Fig. 4. The hollow valve 7 is long enough to cut off gas from all of the tubes 3 except the one that happens to be opposite the port 8.

A piston rod 12 passing through a stuffing box 13 connects the valve 7 with suitable gearing such as the intermittent gear wheel 14 and specially shaped intermittent rack 15 for producing rapid motion of the port 8 from one tube to the next and for allowing the port to dwell for a short interval while opposite each tube. Such intermittent motion although desirable is not absolutely necessary.

At the beginning of the water-gas run, all of the tubes 3 are closed and gas is allowed to pass rapidly through the header 1 of Fig. 1 or header 9 of Fig. 3. Then the first tube to the left is opened. This allows the gas to thoroughly purge out this tube, the excess gas passing out through the water seal at the bottom. After five seconds this tube is closed and simultaneously the second tube is opened by manipulation of the cocks 4 or rotation of the intermittent gear wheel 14 as the case may be.

Then in another five seconds, the second tube is closed and the third opened, and so forth. The result of this is that samples of the gas (and steam) are trapped throughout the run period. These samples cool to room temperature very quickly and draw the colored water into the tubes from the base to a height that depends on the contraction.

Figure 2:
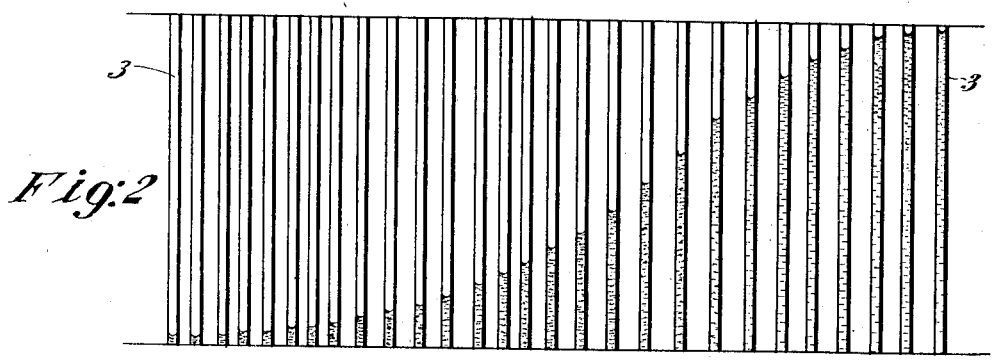
Fig. 2 shows an idealistic appearance of the tubes of Fig. 1 after a plurality of samples have been taken at intervals during the run of a water-gas machine.

An idealistic appearance of the tubes after the run is complete is shown in Fig. 2. In practice, the appearance is somewhat different due to the fact that the gas as entrapped in the tubes is at a high temperature, while the gas at the time of measurement is at room temperature. This contraction factor, which is a constant percentage of the gas remaining in the tubes after the condensation of the steam, was explained earlier. This can be corrected without any calculation by having back of the tubes a suitable chart of coordinates.

Figure 6:
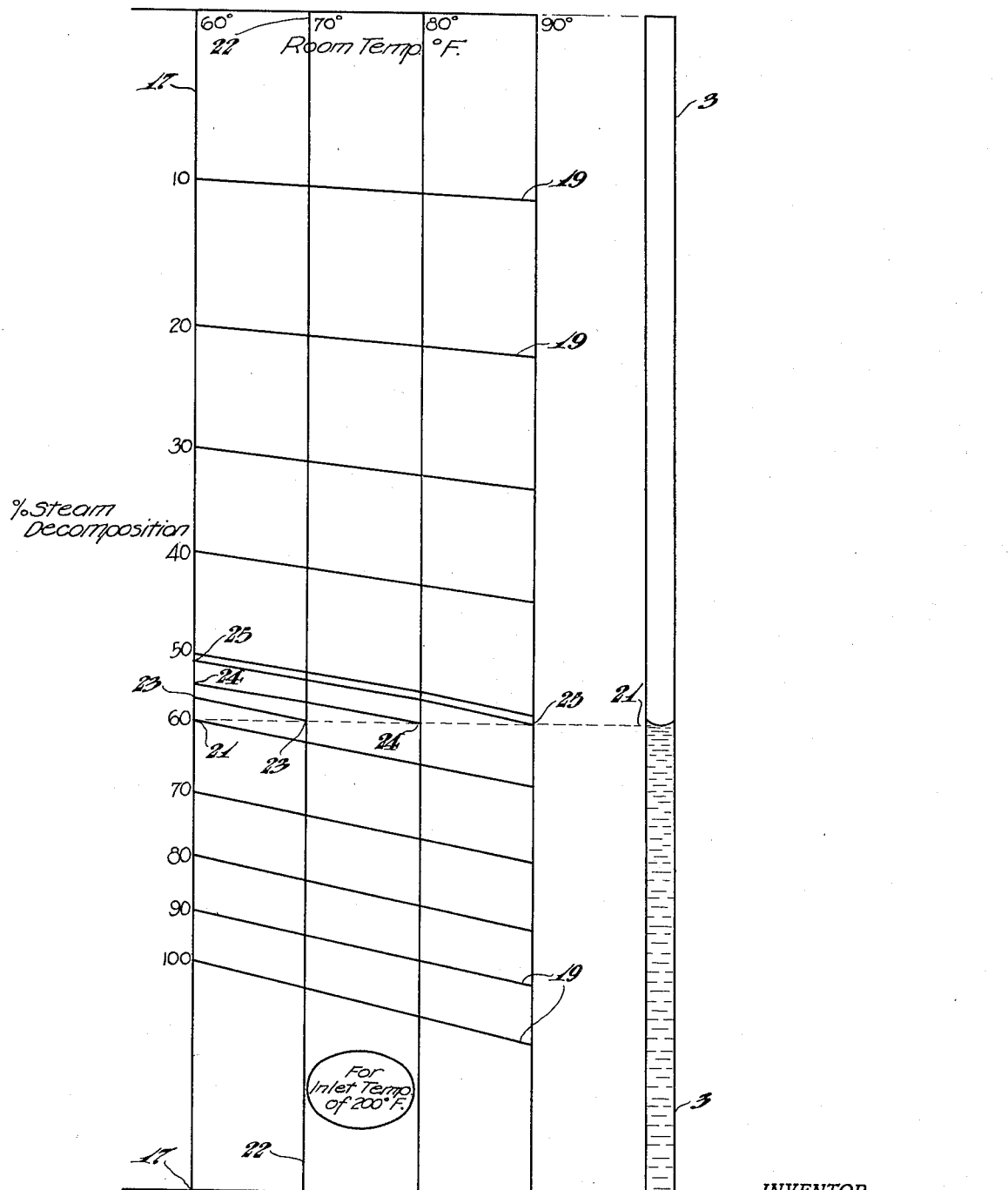
Fig. 6 shows a chart to be placed adjacent the tubes to facilitate the taking of readings.

A type of coordinate chart may be used which gives the steam decomposition reading direct, without the necessity of using factors or tables or of making any calculations. An example of such a chart is shown in Fig. 6 and in use it is placed at one side of the series of vertical tubes 3. This particular chart is based on the assumption that the inlet temperature of the gas-steam mixture is always 200° F. and that the water gas generator so operates that one volume of steam makes two volumes of blue gas. This latter assumption has been found to be very nearly correct in practice.

In Fig. 6, the vertical scale 17 represents percentages of steam decomposition and the horizontal distances represent room temperatures. Diagonal lines 19 on the coordinate chart permit readings of all possible combinations of room temperatures and percentages of decomposition. Separate charts are provided for inlet temperatures that differ from 200°.

One of the vertical tubes 3 is shown beside the chart in Fig. 6 to illustrate its use. The tube reading is carried horizontally to the left along the dotted line 21 until the vertical full line 22 corresponding to the room temperature 70° (the final temperature of the gas) is reached. Then the line 23 parallel to the nearest line 19 is followed to the scale at the extreme left. This reading of 56.5% indicates the steam decomposition directly.

If the room temperature were 60° F., then the steam decomposition for the tube shown would be just 60%. At 80° F. it would be about 54.0 percent, found by following line 24. And at 90° F. it would be about 51.0 percent, line 25. The actual chart has lines for each one percent of decomposition, instead of lines for each ten percent as shown.

Figures 11, 12:
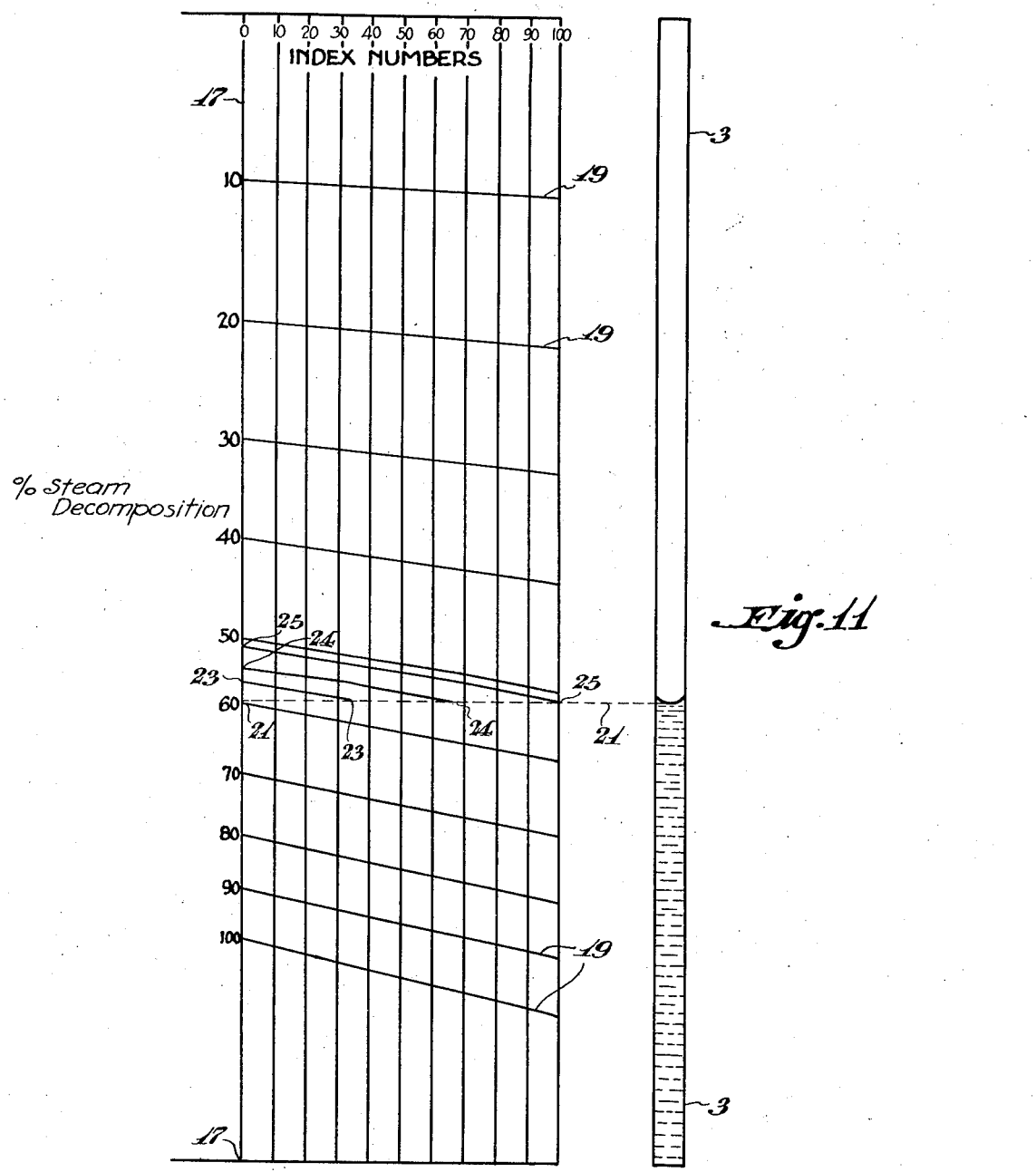
Fig. 11 is a modification of the chart shown in Fig. 6.
Fig. 12 shows a table giving proper index numbers for combinations of inlet temperature and final temperature.

A modification (Fig. 11) of the above described chart permits the reading of any combination of inlet and final temperatures. In such modification, the vertical lines are designated by index numbers, instead of final temperatures. In connection with this modification a table (Fig. 12) is provided which gives the proper index number for any given combination of inlet temperature and final temperature. Then the readings may be carried to the proper vertical line corresponding to this index number and from there to the scale on the left in the same manner as described above.

To secure a true sample of the gas that entirely fills the tube the gas is passed through the tube at a moderately rapid rate of speed and the valve that admits the gas from the header interrupts the stream of gas rather abruptly at the time of closing the tube against the further admission of gas. If the gas were admitted slowly or if the valve closed with a sluggish action steam might be condensing while gas was still being admitted and the residual gas from which the reading would be taken would be the residue from a sample greater in volume than that of the tube.

The above method of operation applies when the temperature of the gas entering the tubes is substantially constant throughout the run. The final temperature is, of course, constant since all the tubes are allowed to come to room temperature. Although gas leaving a water-gas generator varies somewhat in temperature during the run, becoming cooler as the run progresses, the gas is, in many cases, substantially constant in temperature when it reaches the steam decomposition apparatus, due to the heat capacity of the connections. Another factor tending to counterbalance the cooling of the gas delivered to the apparatus is the fact that the gas contains an increasing amount of steam toward the end of the run, and the higher heat capacity of the steam tends to counterbalance the cooler gas.

In case the gas delivered to the apparatus changes in temperatures through the run period, two different accessories may be added to the apparatus. First, the connections between the generator and the steam decomposition apparatus may be increased in mass so as to increase the heat capacity, with consequent leveling out of the temperature variations. Second, the gas entering the apparatus can be passed through a tube 26 surrounded by a steam chamber 27 provided with a steam inlet-pipe 28 and a drain cock 29, thereby insuring a constant temperature of the delivered gas.

At the close of the run, the percentage of steam decomposition may be read and recorded for each small interval of the run. Or, if desirable, a photograph may be taken of the face of the apparatus, thereby giving a permanent record, and graphic curve of the results, without the necessity of drawing a curve.

Modifications other than the tubular slide valve may be used which would eliminate the necessity of stopcocks for each individual tube. A hollow tube 30 mounted for rotation within the header 31 can be pierced by narrow slots 32 parallel to the length of the tube and so arranged spirally that upon slowly revolving this tube, all of the vertical tubes 3 receive their gas samples successively during one complete revolution of the inner tube 30. The tube 30 may be provided with a handle 33 for rotating it and also provided with a stud 35 for engaging a stop 34.

Some of the advantages of this apparatus are that the principle on which it operates is extremely simple and there is absolutely no lag in the indication since an instantaneous sample of gas is entrapped and the period of time required for condensation of steam does not affect the results.

The apparatus is a complete unit in itself, requiring connection only to the gas sampling line. No steam or electric connections are required.

(However, if a steam bath heater is required, a small steam connection would be necessary.)

One operator can make the determinations. No figures need be written in a notebook to distract attention since the apparatus leaves its own record. The final result shows as a curve which can be photographed or else the readings put down at leisure after the run is over.

I claim as my invention:

1. Apparatus for registering the steam content of a gas and comprising a pipe for conveying the gas, a plurality of tubes each having one end connected to said pipe, a vessel adapted to contain liquid to be supplied to the opposite end of each of said tubes, and valve means for permitting the tubes to be successively placed in communication with said pipe.

2. Apparatus for registering the steam content of a gas and comprising a pipe for conveying the gas, a plurality of tubes each having one end connected to said pipe, a vessel adapted to contain liquid for submerging the opposite end of each of said tubes, and a ported valve within said pipe for successively placing each of said plurality of tubes in communication with said pipe.

3. Apparatus for registering the steam content of a gas and comprising a pipe for conveying the gas, a plurality of tubes each having one end connected to said pipe, a vessel adapted to contain liquid for submerging the opposite end of each of said tubes, a valve having a port therein and mechanism for intermittently moving said valve for successively positioning the port opposite the ends of said plurality of tubes.

4. A method of registering variations in the decomposition of steam in a gas during a period of time which comprises the taking of samples of said gas at successive intervals during said period, cooling the samples to condense substantially all of the steam therein and replacing the condensed steam with a liquid and comparing the amounts of liquid necessary to fill the respective spaces occupied by the steam in the samples before condensation.

5. A method of measuring the decomposition of steam in a gas which comprises the taking of a sample of said gas, cooling the sample to condense substantially all of the steam and replacing the condensed steam with a liquid and measuring the amount of liquid necessary to fill the space occupied by the steam before condensation.

6. Apparatus for registering the steam content of a gas during a period of time and comprising a plurality of condenser devices for receiving samples of said gas at successive intervals during said period, and means for indicating directly in each of said devices the relative volume of steam contained therein.

7. Apparatus for registering the steam content of a gas during a period of time and comprising a plurality of similar devices operating as condensers for independently determining the steam content of said gas, means for supplying gas to said devices at successive intervals during said period, and means for indicating the relative volumes of steam in said devices.

8. Apparatus for registering the steam content of a gas throughout a period of time and comprising a plurality of chambers, means for placing a sample of gas in each chamber at successive intervals of time to permit the condensation of any steam in said samples, and means for supplying liquid for replacing the steam thus condensed.

9. Apparatus for registering the steam content of a gas throughout a period of time and comprising a plurality of transparent chambers, means for placing a sample of gas in each chamber at successive intervals of time to permit the condensation of any steam in said samples, and means for supplying colored liquid for replacing the steam thus condensed.

ALFRED R. POWELL.